United States Patent [19]

McCambridge et al.

[11] 4,350,193

[45] Sep. 21, 1982

[54] POWER TOOL ACCESSORY TABLE

[75] Inventors: James McCambridge, Polo, Ill.; Siebolt Hettinga, Adel, Iowa

[73] Assignee: Central Quality Industries, Inc., Polo, Ill.

[21] Appl. No.: 145,423

[22] Filed: May 1, 1980

[51] Int. Cl.³ .......................... B25N 1/04; B27C 9/00
[52] U.S. Cl. ................................ 144/286 R; 83/477.2; 83/574; 108/159; 144/1 R
[58] Field of Search ...................... 83/574, 477.2, 473; 144/1 R, 3 R, 286 R; 108/159

[56] References Cited

U.S. PATENT DOCUMENTS

| | | | |
|---|---|---|---|
| 2,008,673 | 7/1935 | Ocenasek | 83/473 |
| 2,106,288 | 1/1938 | Tautz | 83/473 |
| 2,615,479 | 10/1952 | Bearup | 144/1 R |
| 3,134,411 | 5/1964 | Broyles | 144/1 R |
| 3,734,151 | 5/1973 | Skripsky | 144/1 R |
| 4,105,055 | 8/1978 | Brenta | 144/286 R |
| 4,184,394 | 1/1980 | Gjerde | 83/477.2 |
| 4,186,784 | 2/1980 | Stone | 83/574 X |

Primary Examiner—W. D. Bray
Attorney, Agent, or Firm—Wegner, McCord, Wood & Dalton

[57] ABSTRACT

A power tool accessory table for attaching portable power tools to convert them for use as table-mounted tools, consisting of a removable plate to which the power tool may be attached so that its cutting element projects above the plate's top surface, and a tabletop with an opening in which the plate and attached tool are supported when placed therein from above. The table also has detachable side panels for enlarging the work surface, a remote switch for controlling the tool, an easily removable safety guard, and a friction locked rip fence for guiding workpieces.

13 Claims, 12 Drawing Figures

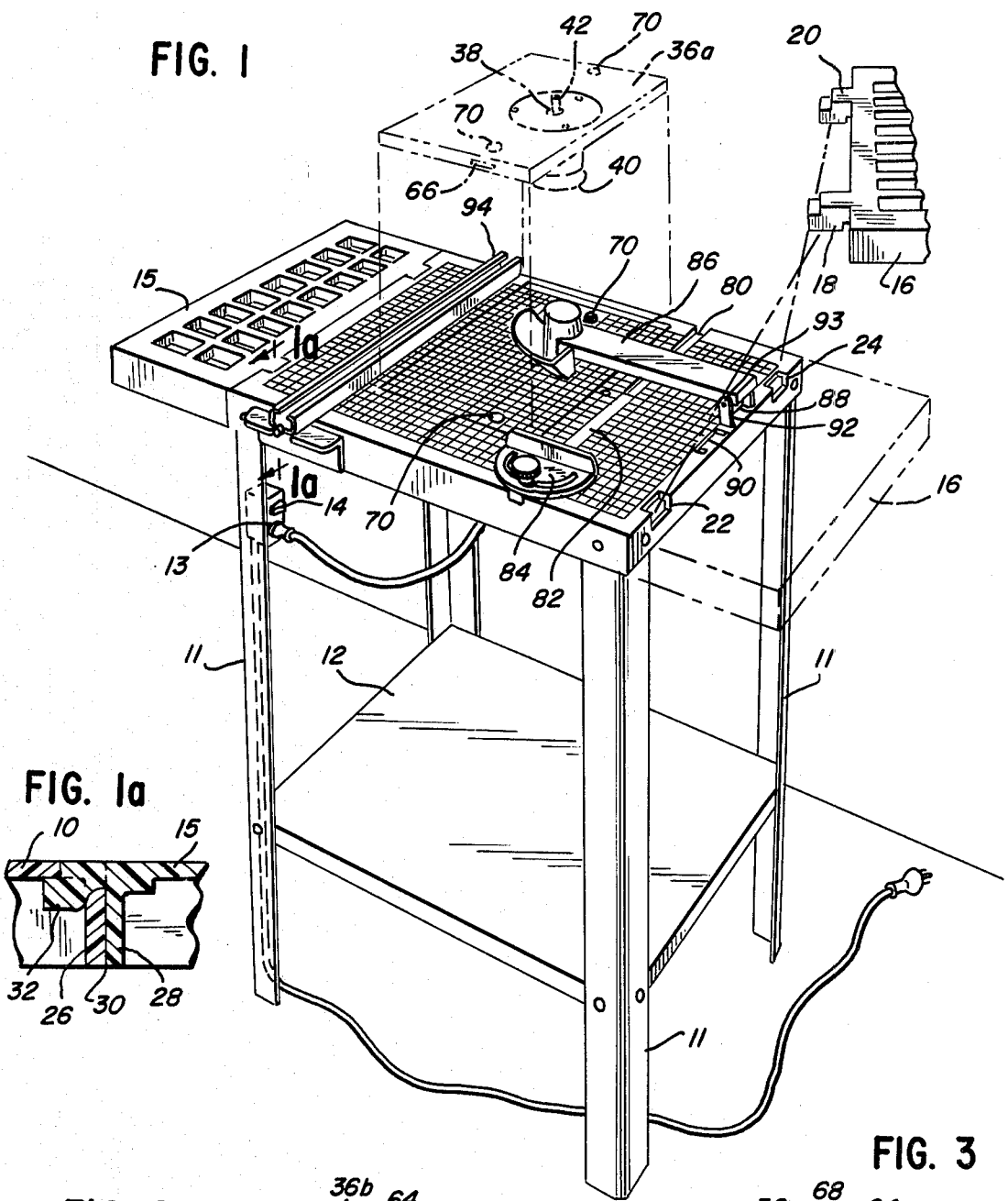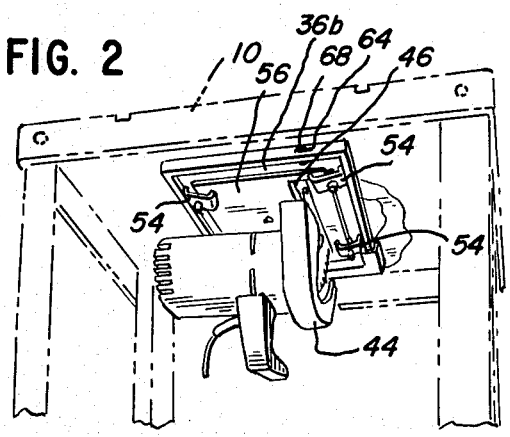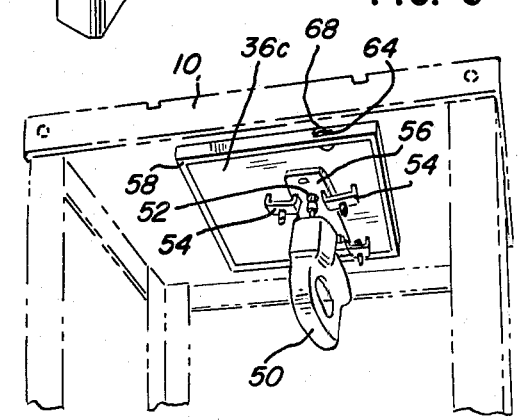

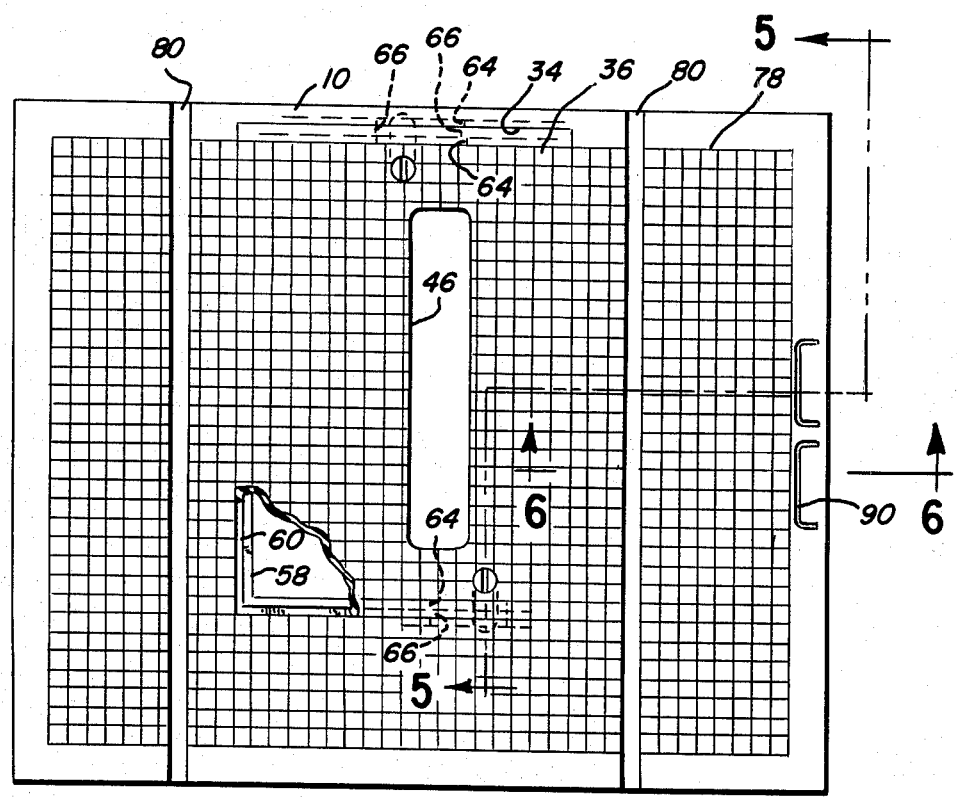
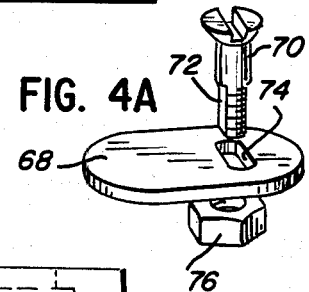
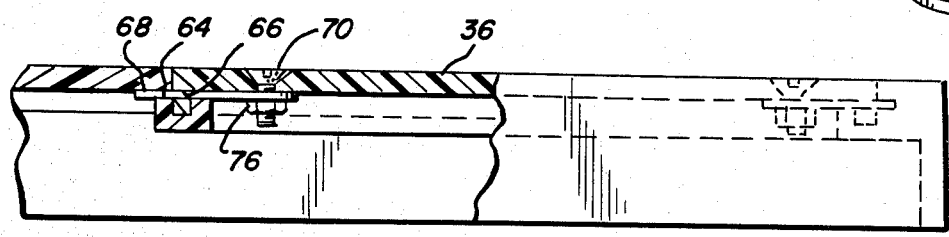
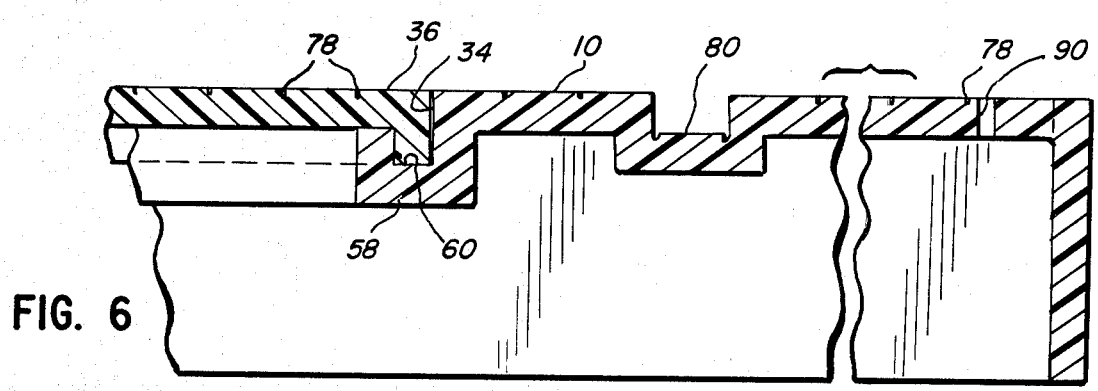

FIG. 7
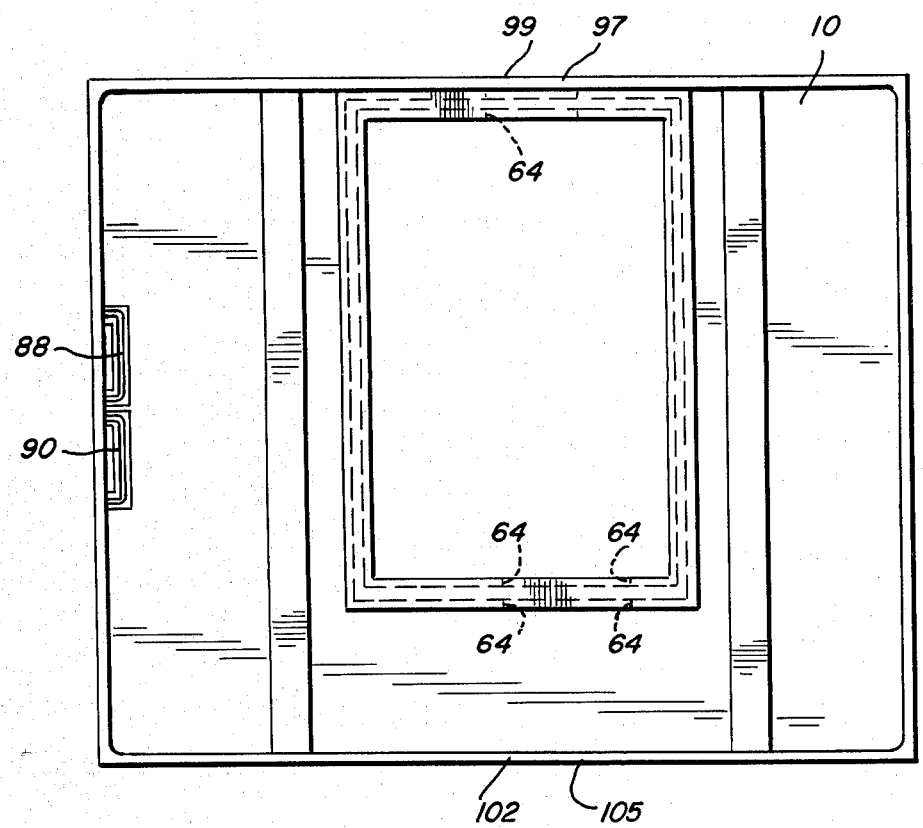
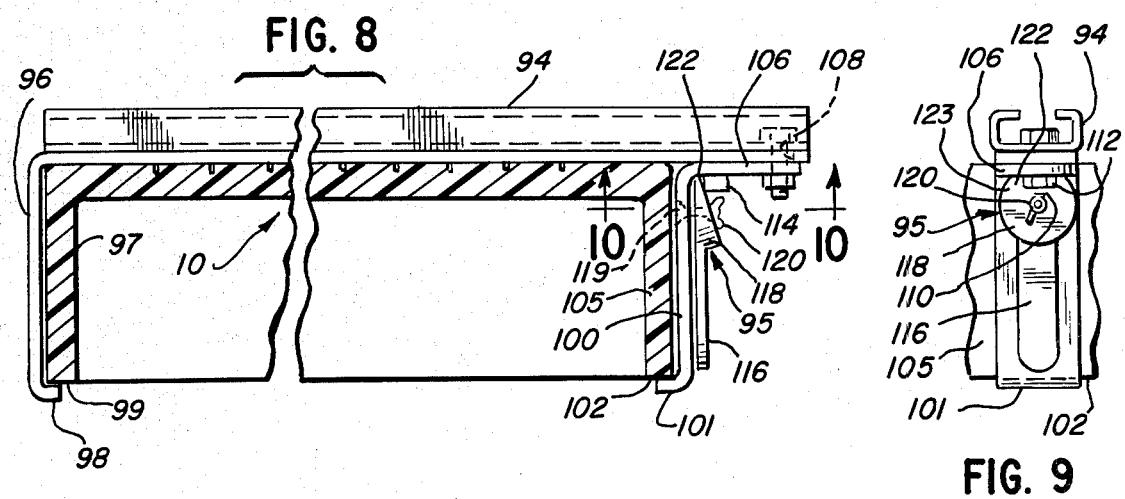
FIG. 8
FIG. 9
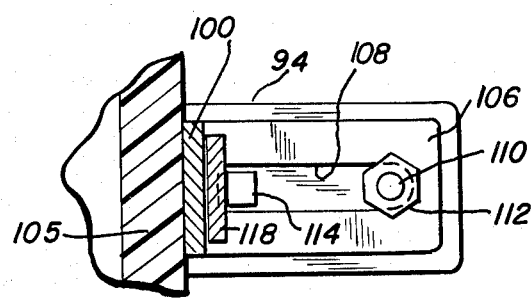
FIG. 10

POWER TOOL ACCESSORY TABLE

BACKGROUND OF THE INVENTION

1. Field of the Invention

This invention relates to power tool accessory tables and, more particularly, to apparatus for mounting different power tools to an upwardly removable portion of the accessory table.

2. Description of the Prior Art

Power tool accessory tables have been on the market for several years. These tables have permitted various portable power tools to be attached to the bottom side of the table so that their cutting elements extend up through an opening in the table to work on pieces located on the tabletop. In order to attach these tools however, it has been necessary either to turn the entire table upside down, or to crawl underneath the table. Turning the table upside down is obviously inconvenient. Crawling under the table is also undesirable since it is normally dirty and the person has to support the weight of the tool while he attaches it to the table.

Other problems have arisen as well. The market for these tables has required that they be fairly small even though some users would prefer to have a larger work surface. Also, these tables have been made entirely from metal, usually steel, but it has been difficult to form such tabletops at a reasonable cost so that they have the desired flatness and tolerances. Also, there is a danger of a shock to a user transmitted through the metal tabletop if a short develops in the attached power tool. Finally, since the power tools, including their controls, have been located underneath the middle of the table, it has been difficult to turn the tools on or off. This is particularly dangerous when an emergency necessitates that the tool be shut off immediately.

The present invention is directed to overcoming one or more of the problems as set forth above.

SUMMARY OF THE INVENTION

This invention involves a power tool accessory table having an opening in the tabletop and a variety of plates to which various portable power tools may be attached, these plates and attached tools being securable in the opening of the tabletop by placing them into the opening from above. By having these detachable plates, the tools may be attached to the underside of the plates and those two together attached to the table without having to turn over the table or crawl underneath it. Also provided with this invention are easily attachable and detachable side panels which permit the user to increase the working surface when desirable. Thus, a single basic table may be used by all craftsmen with the working surface increasable by those who desire it.

The tabletop, side panels and plates, individually or in various combinations, may be molded from structural foam plastic. By using this material rather than steel, the table may be inexpensively formed having good flatness, stability and holding extremely close tolerances usually found only on expensively machined and polished metal tabletops. And since this material is a good insulator, a use is protected from shocks when shorts occur in the power tool.

An electric socket is located on one leg of the table having a switch controlling the power. By plugging the power tool into that socket and controlling the power tool from that switch, an improved safety measure is provided. Since this switch is located on the leg of the table, it can be reached much more easily than the switches on the tool and, thus, the tool may be more quickly shut off in an emergency.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a perspective view of the preferred embodiment of the table made according to the present invention;

FIG. 1a is a partial cross-sectional view showing the method of attaching the side panels to the table;

FIG. 2 is a partial perspective view from beneath the table showing a circular saw as attached;

FIG. 3 is a view similar to FIG. 2 but showing a sabre saw attached;

FIG. 4 is a partially broken away top view of the tabletop showing the circular saw plate;

FIG. 4a shows the locking tab and method for attaching it to the tabletop;

FIG. 5 is a partial cross-sectional elevational view of the tabletop as indicated by line 5—5 in FIG. 4;

FIG. 6 is a partial cross-sectional view indicated by line 6—6 in FIG. 4;

FIG. 7 is a view of the bottom of the tabletop without a plate in its opening;

FIG. 8 is a cross-sectional view showing the rip fence and the means for securing it on the table;

FIG. 9 is an end view of the securing means of FIG. 8; and

FIG. 10 is an enlarged cross-sectional view taken along the line 10—10 of FIG. 8.

DESCRIPTION OF THE PREFERRED EMBODIMENT

The power tool accessory table of this invention is shown in perspective in FIG. 1. A tabletop 10 is supported by four legs 11 having a storage shelf 12 attached beneath the tabletop 10. A socket 13 having an ON/OFF switch 14 is attached inside one leg 11 and may be connected to a power source, such as a wall socket. The power tool used with this table is plugged into this socket 13 and, with its own controls placed in the on position, may be controlled by the ON/OFF switch 14. The switch 14 is located inside the leg 11 to eliminate danger of accidentally turning the tool on or off by bumping the switch.

Side panels 15,16 may be added to increase the working surface of the table. One such panel 16 is shown disconnected with lines indicating where it is attached. By placing the projections 18,20 from the panel 16 into corresponding slots 22,24 in the tabletop 10, the panel 16 may be easily attached to form a flush top surface with the tabletop 10. These projections 18,20 perform a self-locking function as shown in FIG. 1a. With the flanges 26,28 of the tabletop 10 and panel 15 abutting, the weight of the panel 15 causes the panel 15 to want to pivot around the line 30 at the bottom of the panel flange 28. The zigzag shape of the projections 32 uses the panel's own weight to prevent such movement while also permitting the panels 15,16 to be easily attached to the tabletop 10.

The tabletop 10 has an opening 34 therethrough in which a plate 36 holding a power tool may be secured. Since the power tool must be attached to the underside of the table, this removable plate 36 permits the tool to be attached either without turning the table over or without crawling underneath the table. Also, since different tools require different openings in the tabletop for their cutting element, several different plates 36 may be provided to accommodate a variety of tools. As shown in phantom in FIG. 1, a plate 36a having a circular opening 38 therein may have a router 40 secured to its bottom side so that a router bit 42 carried by the router projects above the top surface. Or, as shown in FIG. 2, a circular saw 44 may be secured to the bottom side of a different plate 36b having an elongated opening 46 through which the circular saw blade 48 extends. This opening 46 is wide enough to permit the saw blade to be tilted for use. A sabre saw 50 is shown in FIG. 3 attached to another plate 36c having an opening therethrough for its reciprocating blade 52. Of course, still more plates 36 may be provided to which other tools, such as sanders, drills, and the like, may be attached.

To attach these tools, the plate 36 is laid upside down and the power tool placed in position on its back surface. The plate 36 is rectangular and thus may be laid crosswise over the opening 34 in the tabletop 10. In this position, the cutting element of the tool will extend through the plate 36 and into the opening 34 in the tabletop 10, permitting the tool to be laid flush against the back of the plate 36. Clamps 54 are screwed into the plate 36 to secure the guide surfaces 56 of the various power tools, as shown in FIGS. 2 and 3, to the plate 36.

FIGS. 4 through 7 show the means for securing the plate 36 on the tabletop 10 once the tool is attached. The tabletop 10 has a flange 58 (FIG. 6) running around the interior of its opening 34 which forms a U-shaped groove 60 in which a flange 62 around the bottom of the plate 36 rests. By merely lowering the plate 36 with its attached power tool into the opening 34 in the tabletop 10, the top surface of the two pieces 10,36 is made flush.

To secure the plate 36 and tabletop 10 together, slots 64 are formed in the tabletop flange 58. Corresponding slots 66 (FIG. 7) are also formed in the flange 62 of the plate 36. Oblong locking tabs 68 which may be extended through both slots 64,66, are secured to the plate 36 by means of flat headed screws 70, each having a flat sided shaft 72 (FIG. 4a) which extends through a similarly shaped opening 74 in the tab 68. Each screw 70 extends through the plate 36 with its head flush with the top surface and the tab 68 secured to its shaft 72 on the underside of the plate 36 by a nut 76. By merely using a screwdriver to turn the flat headed screws 70 on the top surface, the locking tabs 68 can be pivoted between locking in the slots 64,66 and unlocking positions. One screw 70 and locking tab 68 combination, as shown in FIG. 4, is located offcenter on one end portion of the plate 36 with the other screw and tab combination located on-center on the opposite end portion of the plate 36. As illustrated, the plate 36 and opening 34 are rectangular and with at least one screw 70 and tab 68 combination offcenter, it is not possible to mount and lock the plate 36 in the opening with the tool operatively facing in the wrong direction. Another way to prevent the tool from being mounted backwards on the table would be to provide an angled corner on the plate 36 and a mating angled corner in the opening 34 so that the plate 36 could not be assembled on the table in any way except the correctly oriented way.

In one preferred form of the invention, the tabletop 10, side panels 15,16 and plate 36 are all molded from structural foam plastic, enabling these components to be accurately, yet inexpensively, formed. Warping problems which have occurred with conventional metal tops is thereby eliminated. This also permits a grid 78 to be inexpensively formed on the top surface by forming grooves therein. Reference numerals and the like may also be moved into the top surface. The grid 78 is useful in properly placing workpieces on the tabletop 10. And, of course, this plastic material insulates against shocks which might normally result from shorts occurring with the power tool. It should be recognized that the tabletop 10 could be of metal, such as steel or die cast aluminum, and the plate 36 could be of plastic material or vice versa and still provide an insulating effect between the tool and the operator.

Several additional features are provided with the improved tabletop. Grooves 80 are provided in the tabletop 10 to hold the slide 82 of a miter square 84. And since few portable routers or sabre saws are safety designed for use upside down, a guard 86 is provided for their upwardly projecting cutting elements. This guard 86 is made of a clear Lexan material which enables the user to see the cutting tool and is shaped so that a person cannot accidentally feed material into a router bit 42 or sabre saw blade 52 from the back. Since the cutting elements of a router 40 and a sabre saw 50 are at different positions on the table, different slots 88,90 are provided in the tabletop 10 for holding the guard 86. The slot 88, shown holding the base 92 of the guard 86 in FIG. 1, is used with the router. When a sabre saw is used, the slot 90 adjacent thereto holds the guard base 92. The guard 86 may be pivoted around a pivot 93 on the base 92 during operations to move it out of the way when necessary. The guard base 92 is channel-shaped in cross section and has a snug fit in the slots 88 or 90 such that the base 92, with the guard attached, can be quickly and easily removed from one slot and either inserted in the other slot or laid aside so as to open up the surface of the tabletop. When large pieces of material are to be worked upon, the guard 86 can be removed to afford an unobstructed surface on the tabletop.

A rip fence 94, used typically as a guide with a circular saw when cutting a board, is also provided as shown in detail in FIGS. 8 to 10. The movable fence 94 can be frictionally secured to the tabletop 10 by a cam method 95 shown. A flange 96 is secured to one end of the fence 94 and slidably engages the side 97 of the tabletop 10 and has a tab 98 engaging beneath the lower edge 99 of the table. A Z-shaped flange 100 is secured to the other end of the fence 94 and has a lower tab 101 engaging beneath the edge 102 of the side 105 of the table and has an upper tab 106 extending in a direction opposite to the tab 101. The tab 106 has an elongate slot 108 therethrough through which a bolt 110 from the fence 94 extends. A nut 112 loosely secures the flange 100 to the fence 94. A projection 114, formed on the fence 94, projects downwardly through the oblong or elongate slot 108. A lever 116 has a circular tapered cam 118 on one end thereof, which cam is bolted to the flange 100 by a screw 119 and wing nut 120. The cam 118 has a thin portion 122 and a gradually thickening portion 123 on at least one side thereof. The cam 118 is wedged between the flange 100 and the projection 114. Rotating the lever 116 about the screw 119 will move the cam 118 from a position, for example, where the thin portion 122 is wedged between the projection 114 and the flange 100 to a position with the thick portion 123 being therebetween to thereby urge both flanges 96 and 100 against the opposite sides 97,105 of the table to lock the fence 94 to the table.

We claim:

1. In a table to which a power tool may be attached so that its cutting element extends above the top surface of the table, the improvement comprising:
   an opening in the tabletop;
   a plate, means for securing the power tool to the bottom of said plate with the cutting element of the power tool extending through an opening in the plate;
   means for supporting said plate and said power tool in said opening when said plate and said power tool are placed in said opening from above said means for supporting said plate comprises:
   a flange around the bottom of said plate;
   means forming a groove around the interior of said opening in said tabletop for receiving said flange on the plate; and
   means for locking said flange in said groove.

2. The improvement of claim 1, wherein said plate means comprise a variety of separate plates which have openings appropriate for use with the cutting components of a variety of power tools wherein one plate may be selectively used dependent upon the power tool used.

3. The improvement of claim 1, wherein said tabletop and plate means are made of molded plastic.

4. The improvement of claim 3, wherein an aligning grid is formed on the surface of the tabletop and plate means to aid in locating the piece to be worked on.

5. The improvement of claim 1, further comprising:
   a rip fence having a fixed flange on one end and an adjustable flange on the other end extending over the opposite sides of said tabletop for guiding said fence; and
   means for urging said flanges together so as to press against the opposite sides of said tabletop to frictionally secure said fence in a working position.

6. The improvement of claim 1, further comprising:
   an electrical outlet carried by a leg of said table;
   a switch on said outlet for energizing said outlet; and
   means for connecting said outlet to a source of electrical power whereby said power tool is plugged into said outlet for control of said outlet and tool by said switch.

7. The improvement of claim 1, wherein said means for locking said flange in said groove comprises tab means secured to said plate which may be extended through slots in said flange.

8. The improvement of claim 7, wherein said tab means includes two tabs mounted unsymmetrically with respect to each other on opposite ends of said plate in said tabletop whereby said plate can only be fastened oriented in one direction in said opening.

9. The improvement of claim 1, wherein mating means are provided on said plate and in said opening in said tabletop wherein only one orientation of said plate in said opening is possible.

10. The improvement of claim 1, wherein said tabletop and plate are made of plastic having an aligned grid formed on the top surface.

11. In a power tool accessory table for securing a portable power tool for use as a table mounted tool, the improvement comprising:
    a tabletop with an opening therein through which a complete portable power tool may pass;
    plate means for supporting said power tool and having an opening in said plate means;
    means for securing the power tool to the underside of said plate means whereby the cutting component of the attached power tool projects through the opening in said plate means;
    support means carried by the underside of the tabletop and overlapping the lower portion of the opening in the tabletop;
    a depending flange around the bottom edge of said plate means having slots on opposite sides thereof, said depending flange resting on said support means from above;
    slots in said support means on said tabletop aligning with said slots in said flange on said plate means;
    means for securing said plate means and attached tool to said tabletop wherein a surface on said plate means is flush with said tabletop surface; and
    said last named means comprising tabs on said plate means which may be extended into said aligned slots.

12. In a power tool accessory table for securing a portable power tool for use as a table mounted tool, the improvement comprising:
    a tabletop with an opening therein through which a complete portable power tool may pass;
    plae means for supporting said power tool and having an opening in said plate means;
    means for securing the power tool to the underside of said plate means whereby the cutting component of the attached power tool projects through the opening in said plate means;
    support means carried by the underside of the tabletop and overlapping the lower portion of the opening in the tabletop;
    said support means comprising:
    a depending flange around the bottom edge of said plate means having slots on opposite sides thereof;
    a flange around the interior of said opening in said tabletop forming a groove for receiving said flange on said plate means;
    slots in said flange on said tabletop aligning with said slots in said flange on said plate means;
    said plate means with the power tool attached thereto is positioned from above in said opening in the tabletop with said plate means resting on said support means from above; and
    means for securing said plate means and attached tool to said tabletop wherein a surface on said plate means is flush with said tabletop surface;
    said means for securing said plate means and said tabletop comprise tabs on said plate means which may be extended into said aligned slots.

13. The improvement of claim 12, wherein at least one of said aligned slots is formed offcenter and unsymmetrical with respect to the aligned slots in the opposite side of said plate means.

* * * * *